(12) United States Patent
Kim et al.

(10) Patent No.: US 11,478,750 B2
(45) Date of Patent: Oct. 25, 2022

(54) FEED SPACER AND REVERSE OSMOSIS FILTER MODULE INCLUDING SAME

(71) Applicant: LG CHEM, LTD., Seoul (KR)

(72) Inventors: Dae Hun Kim, Daejeon (KR); Ayoung Lee, Daejeon (KR); Kyunghoon Min, Daejeon (KR); Bumjoo Kim, Daejeon (KR); Ye Hoon Im, Daejeon (KR)

(73) Assignee: LG CHEM, LTD., Seoul (KR)

( * ) Notice: Subject to any disclaimer, the term of this patent is extended or adjusted under 35 U.S.C. 154(b) by 265 days.

(21) Appl. No.: 16/623,735

(22) PCT Filed: Nov. 13, 2018

(86) PCT No.: PCT/KR2018/013841
§ 371 (c)(1),
(2) Date: Dec. 17, 2019

(87) PCT Pub. No.: WO2019/117479
PCT Pub. Date: Jun. 20, 2019

(65) Prior Publication Data
US 2020/0114313 A1    Apr. 16, 2020

(30) Foreign Application Priority Data

Dec. 12, 2017 (KR) .................. 10-2017-0170395
Nov. 12, 2018 (KR) .................. 10-2018-0137968

(51) Int. Cl.
| | | |
|---|---|---|
| *B01D 61/02* | (2006.01) | |
| *B01D 61/10* | (2006.01) | |
| *B01D 61/08* | (2006.01) | |

(52) U.S. Cl.
CPC ............ *B01D 61/025* (2013.01); *B01D 61/10* (2013.01); *B01D 61/08* (2013.01); *B01D 2313/143* (2013.01)

(58) Field of Classification Search
CPC ................. B01D 63/10; B01D 63/103; B01D 2313/143; B01D 61/025; B01D 61/10; B01D 61/08; B01D 65/08; C02F 1/44
See application file for complete search history.

(56) References Cited

U.S. PATENT DOCUMENTS

| | | | | |
|---|---|---|---|---|
| 5,275,726 A | * | 1/1994 | Feimer .................. | B01D 63/10 210/321.74 |
| 5,538,642 A | * | 7/1996 | Solie ..................... | B01D 53/22 210/321.83 |
| 6,656,362 B1 | | 12/2003 | Kihara et al. | |
| 6,881,336 B2 | | 4/2005 | Johnson | |
| 10,035,106 B2 | | 7/2018 | Kidwell | |
| 10,576,422 B2 | | 3/2020 | Choi et al. | |
| (Continued) | | | | |

FOREIGN PATENT DOCUMENTS

| | | |
|---|---|---|
| CN | 103316590 | 9/2013 |
| EP | 3028761 A1 | 6/2016 |
| (Continued) | | |

*Primary Examiner* — Hayden Brewster
(74) *Attorney, Agent, or Firm* — Dentons US LLP

(57) ABSTRACT

Provided is a feed spacer, in which angles of strands are differently formed in one feed spacer according to a flow direction of raw water, so that a differential pressure decrease region and a recovery increase region are separated to perform multiple functions, and a reverse osmosis filter module including the feed spacer.

4 Claims, 2 Drawing Sheets

(56) References Cited

U.S. PATENT DOCUMENTS

| | | | |
|---|---|---|---|
| 2003/0205520 A1* | 11/2003 | Johnson | B01D 63/10 210/321.85 |
| 2004/0182774 A1 | 9/2004 | Hirokawa et al. | |
| 2007/0131614 A1* | 6/2007 | Knappe | B01D 63/12 210/636 |
| 2008/0190836 A1 | 8/2008 | Beppu et al. | |
| 2010/0108593 A1 | 5/2010 | Chikura et al. | |
| 2012/0298578 A1 | 11/2012 | Herrington et al. | |
| 2013/0341264 A1 | 12/2013 | Kidwell | |
| 2015/0060360 A1* | 3/2015 | Motherway | B01D 63/10 210/639 |
| 2017/0291143 A1 | 10/2017 | Zhou et al. | |
| 2018/0117533 A1* | 5/2018 | Arafat | B01D 63/12 |
| 2018/0207586 A1* | 7/2018 | Choi | B01D 65/08 |
| 2018/0250637 A1* | 9/2018 | Jons | B01D 65/003 |
| 2020/0376440 A1* | 12/2020 | Hager | B01D 65/10 |

FOREIGN PATENT DOCUMENTS

| | | | | |
|---|---|---|---|---|
| EP | 3609607 | | 2/2020 | |
| JP | 2000237554 | | 9/2000 | |
| JP | 3230490 | | 11/2001 | |
| JP | 2004-089764 | | 3/2004 | |
| JP | 2004089763 | | 3/2004 | |
| JP | 2004089763 A * | | 3/2004 | ............ B01D 63/10 |
| JP | 2004-283708 | | 10/2004 | |
| JP | 2006-507919 | | 3/2006 | |
| JP | 2007117949 | | 5/2007 | |
| JP | 2015-526282 | | 9/2015 | |
| JP | 2018-523566 | | 8/2018 | |
| KR | 10-0976074 | | 8/2010 | |
| KR | 10-20150036192 | | 4/2015 | |
| KR | 10-20170038646 | | 4/2017 | |
| KR | 10-20170063759 | | 6/2017 | |
| WO | WO-2017057833 A1 * | | 4/2017 | ............ B01D 61/02 |
| WO | 2018-190937 | | 10/2018 | |

* cited by examiner

[Figure 3]
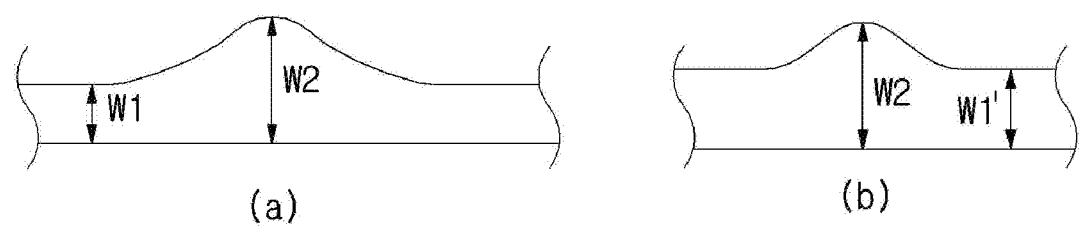

FEED SPACER AND REVERSE OSMOSIS FILTER MODULE INCLUDING SAME

CROSS-REFERENCE TO RELATED APPLICATIONS

This application is a National Stage Application of International Application No. PCT/KR2018/013841 filed on Nov. 13, 2018, which claims priority to and the benefit of Korean Patent Application Nos. 10-2017-0170395 and 10-2018-0137968 filed in the Korean Intellectual Property Office on Dec. 12, 2017 and Nov. 12, 2018, the entire contents of each of which are incorporated herein by reference.

TECHNICAL FIELD

The present invention relates to a feed spacer and a reverse osmosis filter module including the same, and more particularly, to a feed spacer, in which angles of strands are differently formed in one feed spacer according to a flow direction of raw water, so that a differential pressure decrease region and a recovery increase region are separated to perform multiple functions, and a reverse osmosis filter module including the same.

BACKGROUND

As global warming deepens water shortage, a water purification technology, which is an alternative water resource securing technology, is attracting attention.

Accordingly, it is expected that a water treatment process using a reverse osmosis membrane, which is a core technology of a next-generation water supply business utilizing alternative water resources, such as seawater desalination and reuse of water, leads a water industry market.

Water penetrating the reverse osmosis membrane becomes pure water or water close to infinitely pure water and is used in various fields, such as sterilized water for medical use, purified water for artificial dialysis, or water for manufacturing a semiconductor in an electronic industry.

Herein, reverse osmosis separates two solutions having a concentration difference with a semipermeable membrane, and generates a predetermined water level difference while a solution having a lower concentration moves to a solution having a higher concentration after a certain period of time, which is called an osmotic phenomenon. Further, the difference of the water level generated during the process refers to a reverse osmosis pressure. A device, which makes only water molecules pass the semipermeable membrane by using the principle thereof and purifies water, is referred to as reverse osmosis equipment, and the semipermeable membrane included in the reverse osmosis equipment is a reverse osmosis filter module.

The reverse osmosis filter module includes a center tube, a feed spacer, a reverse osmosis (RO) membrane, a tricot filtered water path, and the like.

Among them, the feed spacer serves as a passage, through which raw water is introduced. The feed spacer is formed in one shape of a mesh form. When raw water flows into the feed spacer formed of one shape, a differential pressure is generated due to hindrance of a flow by the feed spacer to cause a problem in that energy cost is increased.

Further, a concentration polarization phenomenon is essentially generated in the vicinity of the reverse osmosis membrane by water permeation flux, and as the concentration polarization phenomenon is intensified, an osmosis pressure is increased in the vicinity of the reverse osmosis membrane, so that there is a problem in that a water permeation ratio is decreased.

In relation to this, there is a need for a feed spacer, which increases efficiency of a reverse osmosis filter module by decreasing the generation of a differential pressure by using one feed spacer and mitigating the concentration polarization phenomenon.

Technical Problem

The present invention is conceived to solve the foregoing problems, and an object of the present invention is to provide a structure of a feed spacer, in which a cross sectional area of a flow path is increased by forming areas, in which crossing angles are different, in one feed spacer, and differing a diameter ratio between a crossing area and a non-crossing area, so that an area for decreasing a differential pressure and an area for increasing a recovery are simultaneously formed.

Technical Solution

An exemplary embodiment of the present invention provides a feed spacer, including: a first set, in which a plurality of strands is positioned in parallel; and a second set, in which a plurality of strands crosses the plurality of strands of the first set and is positioned in parallel, in which a crossing angle of the first set and the second set is increased according to a flow direction of raw water.

In an exemplary embodiment, the crossing angle of the first and second sets can be gradually increased according to the flow direction of the raw water.

In an exemplary embodiment, in the feed spacer, a diameter of a cross point of the first and second sets can be different from a diameter of a non-cross point of the first and second set.

In an exemplary embodiment, in the feed spacer, a diameter difference between a cross point and a non-cross point of the first and second sets can be decreased according to the flow direction of the raw water.

In an exemplary embodiment, the feed spacer can be formed of a first stage and a second stage, and the crossing angle of the first set and the second set in the first stage can be smaller than the crossing angle of the first set and the second set in the second stage.

In an exemplary embodiment, a distance between cross points of the first and second sets in the second stage can be smaller than a distance between cross points of the first and second sets in the first stage.

In an exemplary embodiment, in the feed spacer, a diameter difference of the first stage can be larger than a diameter difference of the second stage according to the flow direction of the raw water.

In an exemplary embodiment, the diameters of the strands at the cross point of the first and second sets can be the same.

In an exemplary embodiment, at the non-cross point of the first and second sets, a diameter of the strand of the first set can be smaller than a diameter of the strand of the second set.

Another exemplary embodiment of the present invention provides a reverse osmosis filter module including the feed spacer.

In an exemplary embodiment, the reverse osmosis filter module can include: a tube including openings for accommodating a permeating liquid in a longitudinal direction; and one or more reverse osmosis membranes, which are extended from the tube in an outside direction and are wound around a circumference of the tube, and the spacer is in contact with the one or more reverse osmosis membranes and is wound around the circumference of the tube.

Advantageous Effects

According to the present invention, a cross sectional area of a flow path is increased by forming areas, in which crossing angles are different, in one feed spacer, and differing a diameter ratio between a crossing area and a non-crossing area, so that an area for decreasing a differential pressure and an area for increasing a recovery are simultaneously formed, thereby achieving a plurality of effects by using one feed spacer.

Figure 1:
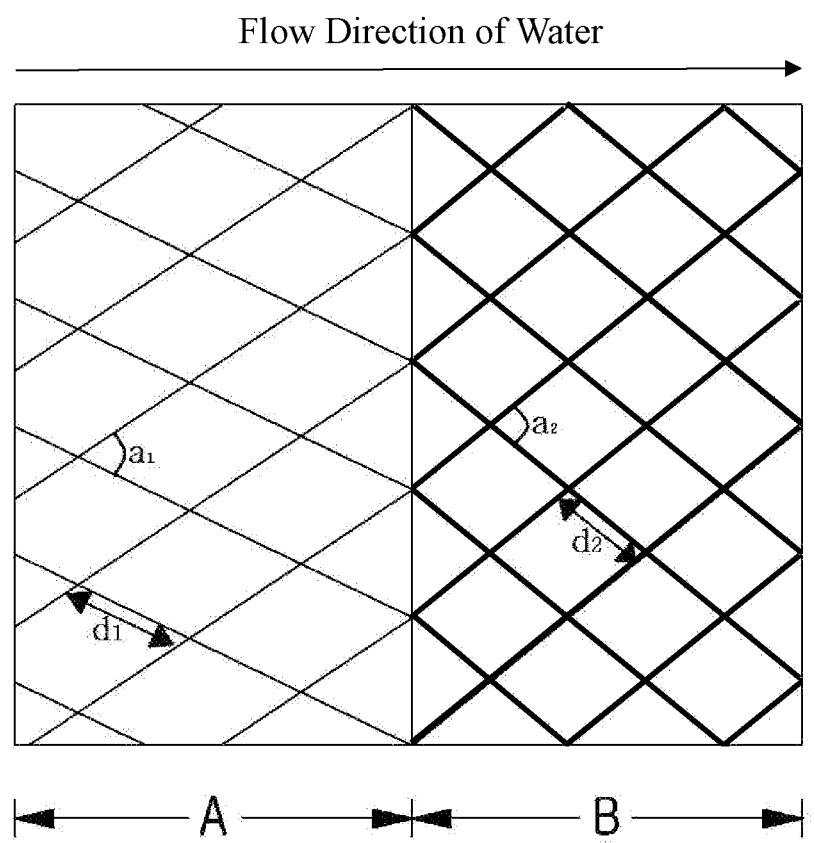
FIG. 1 is a top plan view of a feed spacer according to an exemplary embodiment of the present invention.

(a) of FIG. 3 is an enlarged view of a strand of portion A of FIG. 1, and (b) of FIG. 3 is an enlarged view of a strand of portion B of FIG. 1.

BEST MODE FOR CARRYING OUT THE INVENTION

The present invention will be described in detail with reference to the accompanying drawings. Herein, repeated description, and a detailed description of a publicly known function and configuration which may unnecessarily make the main point of the present invention be unclear will be omitted. The exemplary embodiments of the present invention are provided for completely explaining the present invention to those skilled in the art. Accordingly, shapes, sizes, and the like of the elements in the drawings may be exaggerated for clear description.

In the entire specification, unless explicitly described to the contrary, when it is said that a part "comprises/includes" a constituent element, this means that another constituent element may be further "included/comprised", not that another constituent element is excluded.

Hereinafter, an exemplary embodiment is presented for helping understanding of the present invention. However, the exemplary embodiment below is simply provided for easier understanding of the present invention, and the contents of the present invention are not limited by the exemplary embodiment.

Feed Spacer

Figure 2:
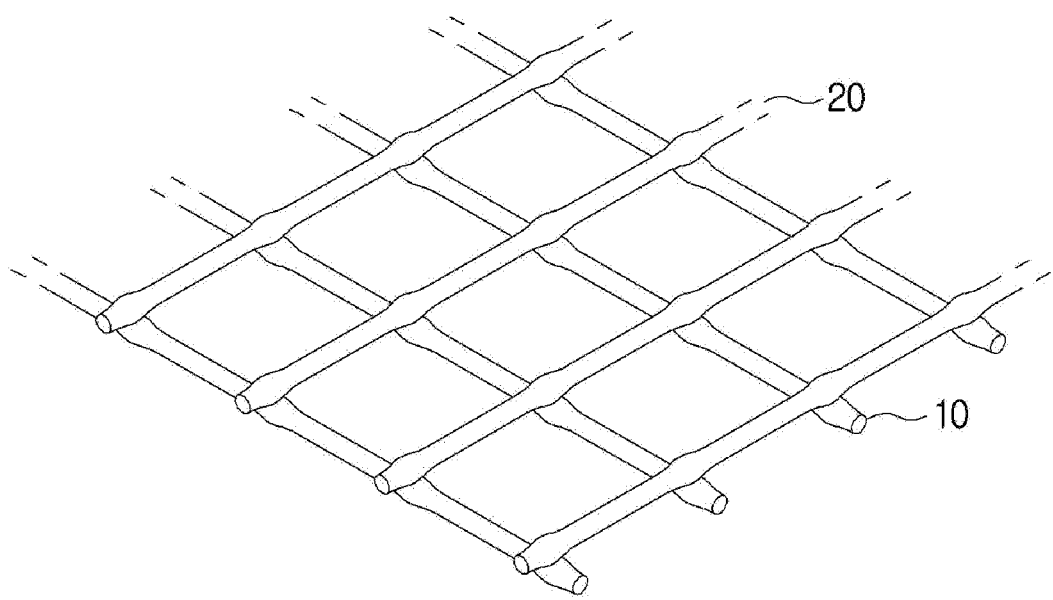
FIG. 2 is a perspective view of the feed spacer according to the exemplary embodiment of the present invention.

FIG. 1 is a top plan view of a feed spacer according to an exemplary embodiment of the present invention, FIG. 2 is a perspective view of the feed spacer according to the exemplary embodiment of the present invention, and (a) of FIG. 3 is an enlarged view of a strand of portion A of FIG. 1, and (b) of FIG. 3 is an enlarged view of a strand of portion B of FIG. 1.

The feed spacer according to the present invention can include a first set and a second set, in which a plurality of strands is positioned in parallel.

In the first set, one or more strands can be positioned in parallel, and herein, the strand can be positioned to be inclined to a direction of raw water. Further, in the second set, one or more strands can also be positioned in parallel, and the second set can be positioned to cross the first set. Further, the second set is positioned with a direction of inclination opposite to a direction of inclination of the first set, so that the first set 10 and the second set 20 can be provided in a grating shape.

Further, the first set 10 can be positioned at an angle of 10° to 80° to a flow direction of raw water, and the second set 20 can be positioned at an inclination of 100° to 170° to a flow direction of raw water. For example, when the strands forming the first set 10 are inclined at 30° to a flow direction of raw water, the strands of the second set 20 can be positioned while being inclined at 120° to the flow direction of raw water.

In this case, when an angle formed between the first set 10 and the flow direction of raw water is less than 10°, a cross sectional area of a flow path formed by the strands is decreased and a laminar flow velocity gradient is not generated in a center portion of the feed spacer, so that there can be a problem in that a polarization phenomenon is increased, and when an angle formed between the first set 10 and the flow direction of raw water is larger than 80°, a cross sectional area of a flow path is decreased and the raw water actively flows in up and down directions, so that there can be a problem in that pressure loss is increased. Herein, the flow path is formed by the strands forming each set, and can mean a space between reverse osmosis membranes positioned in an upper portion and a lower portion of the feed spacer and each set.

Further, in the feed spacer according to the present invention, a crossing angle of the first set 10 and the second set 20 can be different according to a flow direction of raw water. More particularly, an area A, in which a differential pressure is decreased, and an area B, in which recovery is increased, can be separated according to the angle between the first and second sets. The extents of the area, in which a differential pressure is decreased, and the area, in which recovery is increased, are not limited as long as the areas are capable of performing the functions.

Further, the area A, in which a differential pressure is decreased, can be in a portion which is in first contact with raw water, and the area B, in which recovery is increased, can be positioned at one side of the area A according to a flow direction of the raw water.

That is, the crossing angle of the first and second sets 10 and 20 can be increased according to the flow direction of the raw water. The angle can be gradually increased.

Accordingly, the feed spacer according to the present invention can be formed with two stages. First stage is an area A, in which a differential pressure is decreased, and second stage is an area B, in which recovery is increased.

In first stage, the crossing angle of the first and second sets 10 and 20 is a1, a distance of between cross points formed according to the cross of the first and second sets 10 and 20 is d1.

In second stage, the crossing angle of the first and second sets 10 and 20 is a2, a distance of between cross points formed according to the cross of the first and second sets 10 and 20 is d2.

a1 can be formed to be smaller than a2, and d1 can be formed to be larger than d2.

That is, based on the same area, a density of the cross points in the area, in which the differential pressure is decreased, can be low, and a density of the cross points in the area, in which the recovery is increased, can be high.

In the feed spacer according to the present invention, diameter ratios of the strands forming the first and second sets can be different according to the area, and diameters of the cross point and a non-cross point of the first and second sets 10 and 20 can be different. Referring to FIG. 2, a thickness of each of the strands forming the first and second sets 10 and 20 can be asymmetric, and this can mean that a protruding portion is formed at the center of the strand and a diameter of the strand is increased, so that the diameters of the protruding portion and a non-protruding portion are asymmetrically formed.

In the exemplary embodiment, a diameter ratio of the strand forming the area A, in which the differential pressure is decreased, can be formed to be larger than a diameter ratio of the strand forming the area B, in which the recovery is increased. Referring to FIG. 3, a difference between a diameter W2 of the protruding portion and a diameter W1 of the non-protruding portion of the strand forming the area A, in which the differential pressure is decreased, can be formed to be larger than a difference between the diameter W2 of the protruding portion and a diameter W1' of the non-protruding portion of the strand forming the area B, in which the recovery is increased. That is, the difference between the diameters of the strands at the cross point and the non-cross point can be decreased according to the flow direction of raw water.

Further, the feed spacer according to the present invention has the same thickness regardless of the area. That is, the protruding portions of the first and second sets 10 and 20 can cross to form the feed spacer, and the diameters W2 of the protruding portions of the area, in which the differential pressure is decreased, and the area, in which the recovery is increased, can be formed to be the same. More particularly, in the first and second sets 10 and 20 according to the present invention, the protruding portion of the strand forming the first set 10 crosses the protruding portion of the strand forming the second set 20, thereby determining a thickness of the feed spacer. Accordingly, the difference between the diameter ratios of the strand forming each area can be adjusted by the non-protruding portions W1 and W1'.

The feed spacer according to the present invention has an effect in that the plurality of functions and effects are achieved by using one feed spacer by adjusting angles a1 and a2 between the first and second sets 10 and 20 and the diameter ratio of the strand.

More particularly, in the area A, in which the differential pressure is decreased, the flow path of the feed spacer can be increased by decreasing the angle a1 between the first and second sets 10 and 20 and increasing a diameter difference between the protruding portion W2 and the non-protruding portion W1. Accordingly, when raw water is introduced through the feed spacer, the feed spacer does not interrupt a flow of the raw water by the wide flow path, so that there can be an effect in that the differential pressure is decreased. The generation of the differential pressure is decreased, so that it is possible to provide the feed spacer, which is capable of mitigating the concentration polarization phenomenon of the feed spacer and improving efficiency of the reverse osmosis filter module.

More particularly, in the area B, in which the recovery is increased, the flow path of the feed spacer can be decreased by increasing the angle a2 between the first and second sets 10 and 20 and decreasing a diameter difference between the protruding portion W2 and the non-protruding portion W1', thereby increasing the amount of permeating water. That is, in the case where raw water is provided to the feed spacer with the same pressure, when the flow path of the feed spacer is decreased, the pressure is increased. Accordingly, there can be an effect in that the recovery is increased according to the increased pressure.

In this case, the diameter of the non-protruding portion W1 of the area A, in which the differential pressure is decreased, can be different from the diameter of the non-protruding portion W1' of the area B, in which the recovery is increased. That is, the diameter ratio of the area A, in which the differential pressure is decreased, and the area B, in which the recovery is increased, can be adjusted by the non-protruding portions W1 and W1'.

Accordingly, the present invention is characterized in that a height of the feed spacer according to the present invention is the same in the area A, in which the differential pressure is decreased, and the area B, in which the recovery is increased.

Reverse Osmosis Filter Module

The reverse osmosis filter module is a constituent element of a membrane separation device, which serves to purify actually supplied water by using a reverse osmosis pressure principle. The reverse osmosis filter module can include a reverse osmosis membrane, a feed spacer, a tricot filtered water path, and a tube including an opening accommodating a permeating liquid according to a longitudinal direction. Further, the reverse osmosis filter module can further include one pair of telescoping preventing devices, but a detailed description of the telescoping preventing device will be omitted.

One or more reverse osmosis membranes filter foreign materials included in water by using osmosis and serve as a flow path allowing purified water to effectively flow. The one or more reverse osmosis membranes are extended to an outside direction from the tube and are wound around a circumference of the tube.

As the feed spacer, the feed spacer according to the present invention can be provided. More particularly, the feed spacer can be formed of first and second sets, in which a plurality of strands is positioned in parallel, and can be separated into one or more areas by an angle between the first and second sets and a difference in a diameter ratio of the strand between the first and second sets. The feed spacer according to the present invention is the same as the foregoing feed spacer, so that a detailed description thereof will be omitted.

The feed spacer forms a passage, through which raw water is introduced from the outside, and serves to maintain a gap between one reverse osmosis membrane and another reverse osmosis membrane. To this end, the feed spacer is in contact with one or more reverse osmosis membranes at an upper side and a lower side, and is formed to be wound around the circumference of the tube similar to the one or more reverse osmosis membranes.

Herein, a material of the feed spacer is not specially limited, but can include any one of polyethylene, polyvinyl chloride, polyester, and polypropylene.

The tricot filtered water path has a structure of a general fabric form, and serves as a flow path making a space, through which the water purified through the reverse osmosis membrane 10 can flow out.

The tube is positioned at a center of the reverse osmosis filter module for water treatment, and serves as a passage, through which the filtered water is introduced and discharged.

To this end, voids (or openings) having a predetermined size can be formed at an external side of the tube so that the filtered water is introduced. In this case, it is preferred that the number of voids formed can be one or more so that the filtered water is more effectively introduced.

Comparative Example

A feed spacer in the related art is formed in one mesh form, in which angles of the first and second sets, distances between the strands (distances between the cross points), a diameter difference of the strand are the same.

Example

Example is the feed spacer according to the present invention, which is formed in two forms, specifically angles of the sets, distances between the strands (distances between the cross points), and a diameter difference of the strand are different from each other.

TABLE 1

|  | First stage | Second stage |
|---|---|---|
| Pa/μm | 0.0144 | 0.0205 |

TABLE 2

|  | Comparative Example | Example |
|---|---|---|
| Pa/μm | 0.123 | 0.105 |

Table 1 represents a differential pressure (Pa/μm) for a unit length of each of the first stage and the second stage of the Example, and Table 2 represents a differential pressure (Pa/μm) for a unit length of each of the Comparative Example and the Example.

First, in the Example, it can be seen that a differential pressure (Pa/μm) in the area A (the first stage), in which a differential pressure is decreased, is decreased by 70% compared to the area B (the second stage), in which a recovery is increased. Further, a differential pressure per unit length of the Comparative Example is 0.123 Pa/μm and a differential pressure per unit length of the Example is 0.105 Pa/μm, so that it can be seen that the differential pressure per unit length of the Example is decreased by 85% compared to the differential pressure per unit length of the Comparative Example.

In the forgoing, the present invention has been described with reference to the exemplary embodiment of the present invention, but those skilled in the art can appreciate that the present invention can be variously corrected and changed within the range without departing from the spirit and the area of the present invention described in the appending claims.

The invention claimed is:

1. A feed spacer, comprising:
    an area A and
    an area B, and each of area A and area B comprises:
        a first set, in which a plurality of strands is positioned in parallel; and
        a second set, in which a plurality of strands crosses the plurality of strands of the first set and is positioned in parallel,
    wherein:
        the strands of each of the first and the second set include a plurality of protruding portions having a diameter W2, and the protruding portions of the strands forming the first set cross the protruding portions of the strands forming the second set, thereby determining a thickness of the feed spacer,
        the strands of the first set and second set in area A include non-protruding portions having a diameter W1,
        the strands of the first set and second set in area B include non-protruding portions having a diameter W1',
        a difference between the diameter W2 of the protruding portions and the diameter W1 of the non-protruding portions of the strands forming the area A is larger than a difference between the diameter W2 of the protruding portions and the diameter W1' of the non-protruding portions of the strands forming the area B,
        a crossing angle a1 of the first set and the second set in area A is less than a crossing angle a2 of the first set and the second set in area B, and
        a cross-sectional area of a flow path in the area B is decreased with respect to a cross-sectional area of a flow path in area A.

2. The feed spacer of claim 1, wherein a distance between cross points of the first set and the second set in the area B is smaller than a distance between cross points of the first set and the second set in the area A.

3. A reverse osmosis filter module comprising the feed spacer of claim 1, wherein the area A is in a portion which is in first contact with raw water.

4. The reverse osmosis filter module of claim 3, wherein the reverse osmosis filter module includes:
    a tube including openings for accommodating a permeating liquid in a longitudinal direction; and
    one or more reverse osmosis membranes, which are extended from the tube in an outside direction and are wound around a circumference of the tube, and
    the feed spacer is in contact with the one or more reverse osmosis membranes and is wound around the circumference of the tube.

* * * * *